US011829701B1

(12) United States Patent
Chaubal et al.

(10) Patent No.: US 11,829,701 B1
(45) Date of Patent: Nov. 28, 2023

(54) HEURISTICS-BASED PROCESSING OF ELECTRONIC DOCUMENT CONTENTS

(71) Applicant: Accenture Global Solutions Limited, Dublin (IE)

(72) Inventors: Ameet Sunil Chaubal, Atlanta, GA (US); Paulina Sperling, Philadelphia, PA (US); Ruth Anne Sullivan, Blacklick, OH (US); Abhishek Kumar, Haryana (IN); Bradley Roy Hardwick, Jr., Marlton, NJ (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/946,292

(22) Filed: Sep. 16, 2022

Related U.S. Application Data

(60) Provisional application No. 63/357,609, filed on Jun. 30, 2022.

(51) Int. Cl.
*G06F 40/103* (2020.01)
*G06V 30/412* (2022.01)
*G06V 30/262* (2022.01)

(52) U.S. Cl.
CPC .......... *G06F 40/103* (2020.01); *G06V 30/262* (2022.01); *G06V 30/412* (2022.01)

(58) Field of Classification Search
CPC ... G06F 40/103; G06V 30/262; G06V 30/412
See application file for complete search history.

(56) References Cited

U.S. PATENT DOCUMENTS

| 5,228,100 | A | * | 7/1993 | Takeda | G06V 30/412 |
| | | | | | 382/229 |
| 5,386,298 | A | * | 1/1995 | Bronnenberg | H04N 1/32101 |
| | | | | | 235/494 |
| 5,721,940 | A | * | 2/1998 | Luther | G06V 30/1444 |
| | | | | | 715/200 |

(Continued)

FOREIGN PATENT DOCUMENTS

| CN | 111310426 | A | * | 6/2020 | ......... G06K 9/00463 |
| CN | 112906695 | A | * | 6/2021 | ........... G06F 40/177 |

(Continued)

*Primary Examiner* — Shahid K Khan
(74) *Attorney, Agent, or Firm* — Fish & Richardson P.C.

(57) ABSTRACT

A computer-implemented method for obtaining content of a document is provided. The method includes: receiving data in an unknown format obtained by an OCR application from the document, the data comprising a plurality of visual elements; for each of the plurality of visual elements, obtaining a position in the document; determining, from the plurality of visual elements, one or more graphic elements and one or more textual elements; determining a particular graphic element from the one or more graphic elements based on the position of the particular graphic element; determining, from the one or more textual elements, a key that is associated with the particular graphic element; determining, from the one or more textual elements, one or more attributes that are associated with the particular graphic element; generating an association between the key and each of the one or more attributes; and providing a structured representation of the association.

20 Claims, 8 Drawing Sheets

(56) References Cited

U.S. PATENT DOCUMENTS

| | | | | |
|---|---|---|---|---|
| 5,857,034 A * | 1/1999 | Tsuchiya | ............... | G06F 40/174 382/175 |
| 5,987,171 A * | 11/1999 | Wang | ....................... | H04N 1/41 382/173 |
| 6,173,073 B1 * | 1/2001 | Wang | ................... | G06V 30/412 382/175 |
| 7,561,734 B1 * | 7/2009 | Wnek | ................... | G06V 30/412 382/218 |
| 7,685,522 B1 * | 3/2010 | Feuerman | ............. | G06F 40/174 715/728 |
| 8,517,260 B1 * | 8/2013 | Brown | ................... | G06Q 40/02 235/379 |
| 10,095,677 B1 * | 10/2018 | Manohar | ............. | G06V 30/412 |
| 10,395,108 B1 * | 8/2019 | Geng | ............. | G06V 30/19173 |
| 10,402,640 B1 * | 9/2019 | Becker | ................ | G06V 30/412 |
| 10,482,174 B1 * | 11/2019 | Goodsitt | ............ | G06V 10/82 |
| 10,628,633 B1 * | 4/2020 | Geng | ............. | G06V 30/412 |
| 10,878,234 B1 * | 12/2020 | Adam | ................ | G06V 10/426 |
| 2004/0181749 A1 * | 9/2004 | Chellapilla | ........... | G06F 40/174 715/222 |
| 2004/0205530 A1 * | 10/2004 | Borg | ..................... | G06F 40/174 715/234 |
| 2005/0226510 A1 * | 10/2005 | Eguchi | ................. | G06V 30/412 382/199 |
| 2007/0168382 A1 * | 7/2007 | Tillberg | .............. | G06F 16/5846 707/E17.084 |
| 2009/0074296 A1 * | 3/2009 | Filimonova | .......... | G06V 30/412 382/209 |
| 2010/0275113 A1 * | 10/2010 | Bastos dos Santos | ..................... | G06F 40/174 715/227 |
| 2010/0275114 A1 * | 10/2010 | Bastos dos Santos | ..................... | G06F 40/183 715/228 |
| 2011/0249905 A1 * | 10/2011 | Singh | ................... | G06V 30/412 382/225 |
| 2014/0003717 A1 * | 1/2014 | Brito | .................... | G06V 30/412 382/218 |
| 2014/0003721 A1 * | 1/2014 | Saund | ................... | G06V 30/412 715/222 |
| 2014/0006917 A1 * | 1/2014 | Saund | ................... | G06V 30/412 715/222 |
| 2014/0247965 A1 * | 9/2014 | Van Wesep | .......... | G06V 30/412 382/103 |
| 2014/0270349 A1 * | 9/2014 | Amtrup | ................ | G06V 30/142 382/103 |
| 2014/0369602 A1 * | 12/2014 | Meier | .................. | G06V 30/412 382/182 |
| 2015/0169510 A1 * | 6/2015 | Dejean | .................... | G06F 40/14 715/229 |
| 2015/0205777 A1 * | 7/2015 | Campanelli | .......... | G06V 30/418 715/226 |
| 2015/0248391 A1 * | 9/2015 | Watanabe | ........... | G06F 16/9554 715/226 |
| 2016/0026899 A1 * | 1/2016 | Wang | ................... | G06F 18/2163 382/176 |
| 2016/0055376 A1 * | 2/2016 | Koduru | ................ | G06V 30/412 382/176 |
| 2017/0109610 A1 * | 4/2017 | Macciola | ................ | G06F 16/93 |
| 2017/0147552 A1 * | 5/2017 | Carroll | .................... | G06V 10/44 |
| 2017/0169103 A1 | 6/2017 | Juneja et al. | | |
| 2017/0351913 A1 | 12/2017 | Chen et al. | | |
| 2018/0033147 A1 * | 2/2018 | Becker | ................. | G06T 3/0006 |
| 2019/0147238 A1 * | 5/2019 | Kanatsu | ............... | G06V 30/413 382/176 |
| 2019/0266397 A1 * | 8/2019 | Arakawa | ............... | G06V 30/418 |
| 2019/0325247 A1 * | 10/2019 | Ordonez | ................ | G06V 30/15 |
| 2019/0340240 A1 * | 11/2019 | Duta | ...................... | G06V 30/15 |
| 2020/0073878 A1 * | 3/2020 | Mukhopadhyay | ... | G06V 30/412 |
| 2020/0074515 A1 * | 3/2020 | Ghatage | ................ | G06F 40/58 |
| 2020/0160086 A1 * | 5/2020 | Florencio | ............. | G06V 30/412 |
| 2020/0364449 A1 * | 11/2020 | Kawabe | .............. | G06V 30/412 |
| 2021/0073694 A1 * | 3/2021 | Yellin | ............... | G06Q 30/0635 |
| 2021/0133438 A1 * | 5/2021 | Florencio | ................ | G06F 18/41 |
| 2023/0114965 A1 * | 4/2023 | Ferreira | ............... | G06V 30/412 707/737 |
| 2023/0206670 A1 * | 6/2023 | Cui | ........................ | G06V 10/82 382/156 |

FOREIGN PATENT DOCUMENTS

| | | | | |
|---|---|---|---|---|
| EP | 0407935 A2 * | 1/1991 | | |
| JP | H07107694 B2 * | 11/1995 | | |
| KR | 20200082932 A * | 10/2020 | | |
| WO | WO-9715026 A1 * | 4/1997 | ......... | G06K 9/00449 |
| WO | WO-9934307 A1 * | 7/1999 | ......... | G06F 17/3061 |

* cited by examiner

COMMERCIAL INSURANCE APPLICATION
APPLICANT INFORMATION SECTION

XYZABC
DATE (MM/DD/YYYY): 11/13/2020

| CARRIER | | NAICA CODE N/A |
|---|---|---|
| COMPANY POLICY OR PROGRAM NAME | | PROGRAM CODE |

POLICY NUMBER: TBD

| UNDERWRITER | UNDERWRITER OFFICE |
|---|---|

| STATUS OF TRANSACTION | QUOTE ☐ | ISSUE POLICY ☐ | RENEW ☐ |
|---|---|---|---|
| | BOUND (Give date and/or Attach Copy) DATE: | TIME: | AM ☐ PM ☐ |
| | CHANGE | | |
| | CANCEL | | |

AGENCY: Orgnization
123 Main St.
City, State 45678

CONTACT NAME: Ex Ample
FAX No. Ext: (987) 654-3210
FAX No.: (987) 654-5678
E-MAIL ADDRESS: office@organization.com   SUBSCRIBE:
CODE: A01234
AGENCY CUSTOMER ID: TEST-01

SECTIONS ATTACHED

| INDICATE SECTIONS ATTACHED | PREMIUM | | PREMIUM | | PREMIUM |
|---|---|---|---|---|---|
| ACCOUNTS RECEIVABLE / VALUABLE PAPERS | $ | ELECTRONIC DATA PROC | $ | TRANSPORTATION / MOTOR TRUCK CARGO | $ |
| BOILER & MACHINERY | $ | EQUIPMENT FLOATER | $ | TRUCKERS / MOTOR CARRIER | $ |
| BUSINESS AUTO | $ | GARAGE AND DEALERS | $ | X UMBRELLA | $ |
| BUSINESS OWNERS | $ | GLASS AND SIGN | $ | YACHT | $ |
| X COMMERCIAL GENERAL LIABILITY | $ | INSTALLATION / BUILDERS RISK | $ | | $ |
| CRIME | $ | OPEN CARGO | $ | | $ |
| DEALERS | $ | X PROPERTY | $ | | $ |

ATTACHMENTS

| | |
|---|---|
| ADDITIONAL INTEREST | PREMIUM PPAYMENT SUPPLEMENT |
| ADDITIONAL PREMISES | PROFESSIONAL LIABILITY SUPPLEMENT |
| APARTMENT BUILDING SUPPLEMENT | RESTAURANT / TAVERN SUPPLEMENT |
| CONDO ASSN BYLAWS (for D&D Coverage only) | STATEMENT / SCHEDULE OF VALUES |
| CONTRACTORS SUPPLEMENT | STATE SUPPLEMENT (if applicable) |
| COVERAGES SCHEDULE | VACANT BUILDING SUPPLEMENT |
| DRIVER INFORMATION SCHEDULE | VEHICLE SCHEDULE |
| INTERNATIONAL LIABILITY EXPOSURE SUPPLEMENT | |
| INTERNATIONAL PROPERTY EXPOSURE SUPPLEMENT | |
| LOSS SUMMARY | |

PROJECT INFORMATION *(continued)*

12. Deductible: ☐ $1,000
12. Deductible: ☐ $1,000  ☐ $2,500  ☐ $5,000  ☐ $10,000
13. Building Material Valuation Options: ☐ Actual Cash Value  ☐ Replacement Cost
14. Construction Type: ☐ Frame  ☐ Joisted Masonry  ☐ Non-Combustible Masonry
    ☐ Non-Combustible  ☐ Fire Resistive
15. Unit Occupancy Type: ☐ Single Family Home  ☐ Apartment/Multi-Family Dwelling  ☐ Distributor  ☐ Hotel/Motel
    ☐ Light Manufacturing  ☐ Municipal Building  ☐ Office  ☐ Restaurant  ☐ Retail/Mercantile  ☐ School
    ☐ Warehouse

HEURISTICS-BASED PROCESSING OF ELECTRONIC DOCUMENT CONTENTS

CROSS-REFERENCE TO RELATED APPLICATION

This application claims the benefit of U.S. Provisional Pat. App. No. 63/357,609, filed on Jun. 30, 2022, which is incorporated herein by reference.

FIELD

This specification generally describes enhanced techniques for standardizing data and, in one particular implementation, describes a technique for structuring data that is output by optical character recognition (OCR) processes.

BACKGROUND

Many businesses, organizations, and government agencies rely heavily on electronic document processing in their daily operations. Processed documents may contain meaningful textual information that needs to be recognized, edited, or reformatted. However, some documents are electronically saved in image formats that do not support direct text processing, such as JPG, PNG, and image-only PDF.

Although humans can often visually recognize text in these documents, computers are used to perform optical character recognition (OCR) to extract text characters from the documents. The OCR-extracted text characters are then saved in the computer in text formats for further processing.

SUMMARY

In one implementation, an enhanced document processing technique structures data included in a document having an unknown format by replicating processes that might occur in the mind of a human. Specifically, if an electronic document includes visual cues, such as graphical symbols, that might suggest to a user that fields are contextually related, the enhanced document processing technique described by this specification uses those graphical symbols or visual cues as an indication, or as evidence, that the fields are indeed contextually related, and may structure those fields accordingly. Such an enhanced technique allows different fields to be grouped or processed similarly even if other more typical cues are absent, such as when the different fields are not physically close together in the document or where the different fields are not explicitly linked through descriptive text.

In one aspect, a computer-implemented method for electing obtaining content of a document is provided. The method includes receiving data in an unknown format obtained by an OCR application from the document, the data including a plurality of visual elements. The method includes obtaining a position in the document for each of the plurality of visual elements. The method includes determining, from the plurality of visual elements, one or more graphic elements and one or more textual elements. The method includes determining a particular graphic element from the one or more graphic elements based on the position of the particular graphic element. The method includes determining, from the one or more textual elements, a key that is associated with the particular graphic element. The method includes determining, from the one or more textual elements, one or more attributes that are associated with the particular graphic element. The method includes generating an association between (i) the key, and (ii) each of the one or more attributes. The method includes providing a structured representation of the association.

According to some implementations, each position is represented by one or more horizontal coordinates and one or more vertical coordinates.

According to some implementations, in determining the particular graphic element, the method includes: determining contours of the one or more graphic elements based on the positions or an orientation thereof; identifying a box among the one or more graphic elements based on the contours thereof; and determining the box as the particular graphic element.

According to some implementations, the method includes determining a positional relationship between the particular graphic element and each of the one or more textual elements.

According to some implementations, the method further includes identifying a plurality of enclosed boxes within the identified box; determining that the keys associated with plurality of enclosed boxes are the same; grouping the plurality of enclosed boxes as sub-boxes; associating the grouping with the same keys of the sub-boxes; and providing a structured representation of the grouping.

According to some implementations, the method includes determining a total number of the sub-boxes and indicating the total number of the sub-boxes in the structured representation.

According to some implementations, the method includes determining an orientation of arrangement of the sub-boxes; and indicating the orientation in the structured representation.

According to some implementations, in determining the total number of the sub-boxes, the method includes calculating a median number of repetitions of keys within the identified box.

According to some implementations, in determining the orientation of arrangement of the sub-boxes, the method includes: determining horizontal coordinates of the same keys of the sub-boxes; determining vertical coordinates of the same keys of the sub-boxes; calculating a standard deviation of the horizontal coordinates; calculating a standard deviation of the vertical coordinates; and comparing the standard deviation of the horizontal coordinates and standard deviation of the vertical coordinates.

According to some implementations, the method includes identifying a checkbox indicator; determining one or more textual elements as one or more choices corresponding to the checkbox indicator; associating the one or more choices and the checkbox indicator; and providing a structured representation of the association between the one or more choices and the checkbox indicator.

According to some implementations, the checkbox indicator comprises at least one of: a graphic symbol, or a textual prompt.

According to some implementations, the method includes training a machine learning model using the structured representation.

In one aspect, a non-transitory computer-readable medium containing program instructions is provided. The instructions, when executed, cause a computer to perform operations to obtain content of a document. The operations include receiving data in an unknown format obtained by an OCR application from the document, the data comprising a plurality of visual elements. The operations include obtaining a position in the document for each of the plurality of visual elements. The operations include determining, from the plurality of visual elements, one or more graphic elements and one or more textual elements. The operations include determining a particular graphic element from the one or more graphic elements based on the position of the particular graphic element. The operations include determining, from the one or more textual elements, a key that is associated with the particular graphic element. The operations include determining, from the one or more textual elements, one or more attributes that are associated with the particular graphic element. The operations include generating an association between (i) the key, and (ii) each of the one or more attributes. The operations include providing a structured representation of the association.

According to some implementations, the operations further include one or more features similar to those of the method described above.

BRIEF DESCRIPTION OF THE DRAWINGS

FIG. 2 illustrates a section of an example document to be processed, according to some implementations.

FIG. 3A illustrates a section of an example document to be processed, according to some implementations.

FIG. 4 illustrates a section of an example document to be processed, according to some implementations.

Figures are not drawn to scale. Like reference numbers refer to like components.

DETAILED DESCRIPTION

Figure 1:
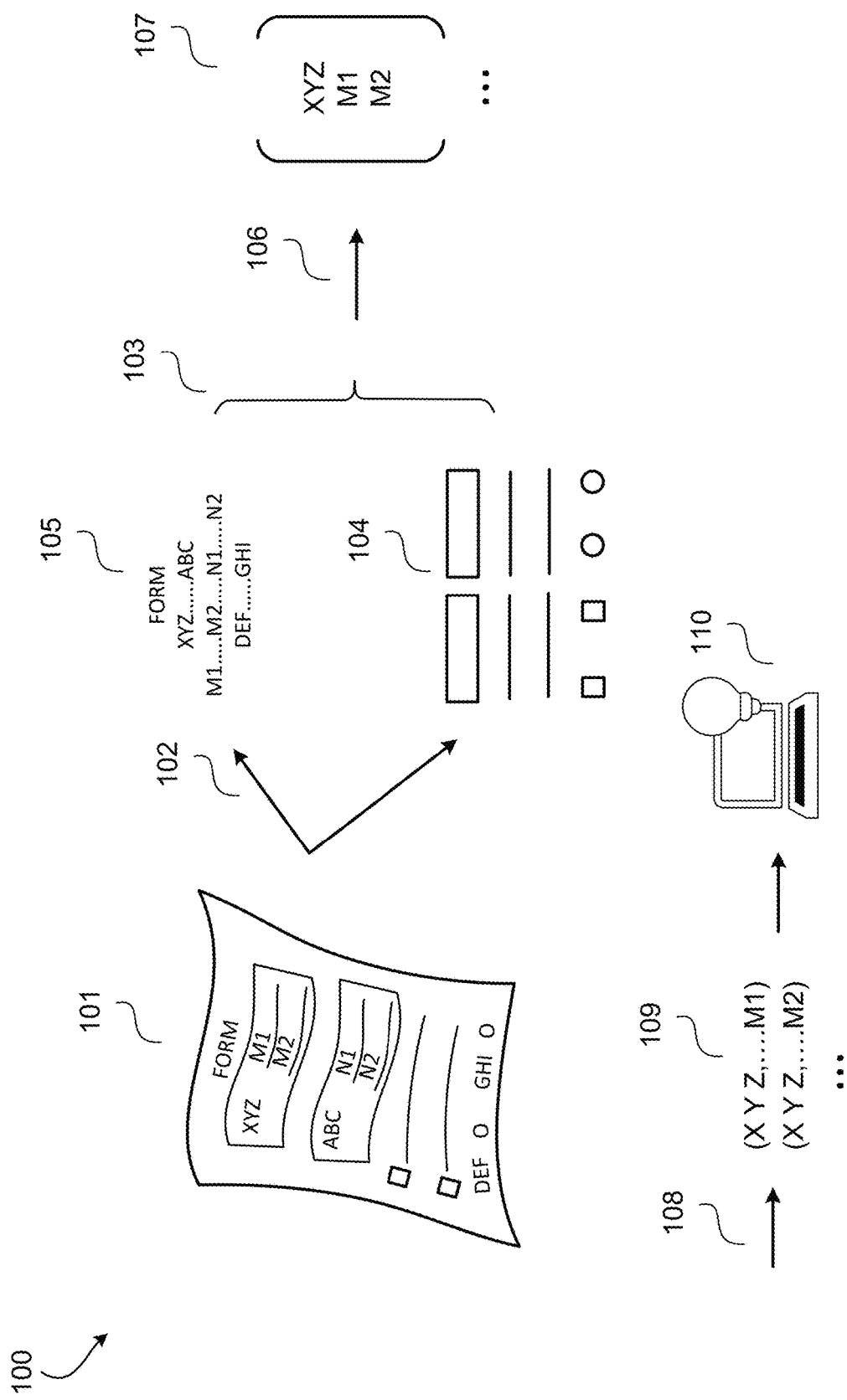
FIG. 1 illustrates an example method for obtaining and processing content of a document, according to some implementations.

FIG. 1 illustrates an example method for obtaining and processing content of a document, according to some implementations.

In general, some electronically-processed documents are forms with designated spaces filled in with textual information. These designated spaces, or "fields," are often indicated by graphic symbols such as boxes, circles, or lines. With the help of the graphic symbols and based on the spatial distribution of the text and the graphic symbols, a human reader of a form can easily understand the logical connections and distinctions among pieces of textual information on the form.

However, OCR cannot easily supply a computer with these logical connections and distinctions indicated by graphic symbols. While OCR may extract raw text located near a graphic symbol such as a box, OCR cannot typically confirm the relationship between a piece of text and the box, and cannot easily confirm the relationship among the pieces of text. For example, OCR cannot tell whether a piece of text (a) describes the subject of the box, (b) describes the content of the box under the subject, or (c) is logically unrelated to the subject of the box.

The demand for automated document processing calls for a technique to supplement that which is missing in OCR. Although there have been attempts to train machine learning models with sample forms to predict the logical relationships among textual elements, the training typically requires a large amount of training samples accompanied by significant human supervision. Moreover, if the form structure changes, the machine learning models need to be re-trained with new sample forms, again incurring significant human effort.

In light of the shortcomings in the techniques above, this disclosure provides a heuristics-based approach that mimics human perception of a form. As described in detail below, implementations of the disclosure utilize spatial clues obtained from positions of textual and graphic symbols, cluster elements based on the spatial clues, and associate textual elements that are "keys" in nature with textual elements that are "attributes" in nature. With these features, implementations of the disclosure can generate a structured representation of the association for automated document processing, and can further use the structured representation to train a machine learning model to improve accuracy of recognition. The process does not rely on prior knowledge of the form's structure and does not involve heavy human intervention. Therefore, this disclosure advantageously improves the efficiency and productivity of electronic document processing.

In FIG. 1, the method 100 can be implemented, e.g., on a computer system including one or more computing devices. The document 101 is first electronically sent to an OCR application 102. The OCR application 102 extracts data from the document 101, recognizes characters and symbols in the data, and outputs a plurality of visual elements 103 based on the recognition. The output of the OCR application 102 can be organized in a variety of formats or can be unformatted.

Each of the visual elements 103 is associated with a position in the document 101. The position of each visual element 103 can be represented by a pair of coordinates (x, y), which indicates a point in the document 101. The position of each visual element 103 can also be represented by a plurality of pairs of coordinates $(x_i, y_i)$, (i=1, 2, . . . ), which indicate a range or a shape in the document 101.

From the visual elements 103, the OCR application 102 can distinguish textual elements 105 from graphic elements 104. Textual elements 105 can be elements that convey a linguistic meaning based on the surrounding context. Examples of textual elements 105 include alphanumeric characters, symbols and characters in non-alphabetic languages, and spacing and punctuation associated with the alphanumeric or non-alphabetic characters. In some implementations, the recognized textual elements 105 can be converted by a computer to, e.g., UNICODE characters.

Different from the textual elements 105, the graphic elements 104 do not by themselves convey a linguistic meaning in the context. Instead, the graphic elements 104 are geometric shapes, such as lines, circles, and polygons, that indicate relationships among the textual elements 105 regardless of a physical proximity of the elements. As an example, a straight line separating two paragraphs can suggest to a human reader that the two paragraphs describe different topics even though the two paragraphs are adjacent to each other. As another example, a rectangle enclosing a list of words can suggest to a human reader that the enclosed words are related to a common subject and that the words not enclosed in the rectangle are not related to the common subject, even if they are adjacent.

The recognized visual elements 103 are sent for key-attribute determination 106. In this operation, a key and one or more attributes are determined as associated with a particular graphic element. For example, in processing a personal information form, the key-attribute determination 106 can determine a box with the heading of "Home Address" as the particular graphic element, identify the text "Home Address" as the key associated with the box, and identify all text enclosed by the box, such as "Street Number," "Street Name," and "Postal Code," as attributes associated with the box. The key-attribute determination 106 thus can identify a key and one or more attributes (Attr1, Attr2, Attr3, Attr4, . . . ) associated with the box, illustrated as 107.

The identified key and one or more attributes are then processed for key-attribute association 108. Each association is a pair of one key and one attribute. Thus, the output of key-attribute association 108 can be structurally represented as (Key, Attr1), (Key, Attr2), (Key, Attr3), (Key, Attr4), . . . . In the example of personal information form above, the associations can include (Home Address, Street Number), (Home Address, Street Name), and (Home Address, Postal Code).

In some implementations, a particular graphic element can be nested within another graphic element, and a key-attribute association can be nested within another key-attribute association. Using the example of personal information form, while the text "Street Name" is an attribute in the (Home Address, Street Name) association, which is associated with the "Home Address" box, it is possible that there is a "Street Name" box nested inside the "Home Address"box. In such a case, the "Street Name" box can be determined as a particular graphic element and the text "Street Name" can now become the key associated with the "Street Name" box. The content of the "Street Name" box, e.g., "Main Street," can now be determined as the attribute in an association (Street Name, Main Street). If the "Street Name" box is empty, then the association can have no attribute, i.e., attribute being "null" or "not applicable."

In some implementations, the associations can be sent to a machine learning model 110 as training sets. The machine learning model 110 can thus be trained to more reliably predict associations when processing other documents. Many classification-based algorithms can be used to implement machine learning model 110. Examples of algorithms include random forest, neural network, K-nearest neighbors, logistic regression, and support vector machines.

Although documents can be designed in a variety of manners, many document have structural elements in common. For example, many documents are designed to surround text and symbols using straight or curved lines. These structural elements are referred to as boxes. Also, many documents have repetitions of similarly-shaped boxes located next to each other. These repetitions of boxes are collectively referred to as sub-boxes. In addition, many documents assign a symbol next to a word or phrase to identify a potential choice under a question or a description. These associations of symbols and words/phrases are referred to as checkboxes. The description below explains how implementations of this disclosure can be used to identify and process boxes, sub-boxes, and checkboxes in a document. One of ordinary skill in the art reading this disclosure would understand that other types of structural elements not described herein can also be identified and processed using implementations of this disclosure.

FIG. 2 illustrates a section 200 of an example document to be processed, according to some implementations. Section 200 is structured to have a top-level box titled "COMMERCIAL INSURANCE APPLICATION" with numerous smaller boxes embedded within the top-level box. Each box encloses some textual elements that, together with the box, convey certain meaning.

The boxes in section 200 can be identified and processed by one or more implementations of this disclosure. According to some implementations, the document is first processed using an OCR application. The OCR application outputs textual elements such as "COMMERCIAL INSURANCE APPLICATION," "AGENCY," "CARRIER," "SECTIONS ATTACHED," "ATTACHMENTS," "11/13/2020," "(987)654-3210," "$", and "X." The OCR application also outputs graphic elements that, in this example, include the lines forming the boxes.

In some implementations, a computer is used to processes the textual elements and the graphic elements to avoid dividing a single word into multiple textual elements or treating characters from multiple words as belong to the same textual element.

In some implementations, a computer is used to process the textual elements and the graphic elements to obtain their locations on the document. The location can be represented by one or more sets of coordinates.

For textual elements, it is important to avoid dividing a single word or phrase into multiple textual elements or treating characters from different words/phrases as belonging to the same textual element. This can be done by grouping characters that are similar in size, horizontally aligned, and closely located. For example, the computer recognizes that letters "C,""O," "WI," "WI," "E," "R," "C," "I," "A," and "L" have the same size and are horizontally located within close proximity of each other. The computer thus can tell that these characters belong to the same textual element "COMMERCIAL INSURANCE APPLICATION." Conversely, the computer recognizes that the characters "X," "Y," "Z," "A," "B," and "C," located at the upper right corner of the document, are not horizontally aligned with, are sized differently from, and are located far away from "COMMERCIAL INSURANCE APPLICATION." The computer thus can tell that "XYZABC" do not belong to the textual element "COMMERCIAL INSURANCE APPLICATION."

The computer can use a variety of methods to represent the location of a textual element. As an example, the computer can record the coordinates of the beginning character and the ending character of a textual element. As another example, a computer can record the coordinates of the center of the textual element and the distances from the boundaries of the textual element to its center.

For graphic elements, the computer can perform a contour analysis to identify all the boxes and determine the exterior and the interior of each box. For example, the computer can trace the perimeter of a rectangular box to determine the coordinates of the four vertices, thereby determining the boundary and orientation of the box. The computer can then execute algorithms such as point-inside-polygon to identify textual elements enclosed within a box.

With all textual elements and boxes identified, the computer associates each box with the enclosed textual elements. The computer can process the boxes in any order. In some implementations, given the hierarchical arrangement of the boxes, the computer starts with a top-level box, i.e., the box that is not in the interior of any other boxes.

In the example of FIG. 2, the computer starts with the largest box that encloses everything else of section 200. The computer determines that all enclosed textual elements, such as "COMMERCIAL INSURANCE APPLICATION," "XYZABC," "AGENCY," "CARRIER,""SECTIONS ATTACHED," "ATTACHMENTS," and "11/13/2020," are associated with the largest box.

The computer then determines, among the enclosed textual elements, a key associated with the largest box. The key can be a header of a box or another textual element that uniquely describes the subject or function of the box. The determination can be based on the coordinates, size, or location of the textual element, as well as relative congruence (or lack thereof) with neighboring textual elements. In the example of FIG. 2, the computer determines that "COMMERCIAL INSURANCE APPLICATION" is centered at the top of the largest box and has the largest size among all textual elements. Therefore, the computer assigns "COMMERCIAL INSURANCE APPLICATION" as the key to the largest box of section 200.

After determining the key, the computer identifies the other textual elements associated with the largest box as attributes. Therefore, for the largest box, the computer can create a plurality of key-attribute pairs such as (COMMERCIAL INSURANCE APPLICATION, AGENCY), (COMMERCIAL INSURANCE APPLICATION, CARRIER), and (COMMERCIAL INSURANCE APPLICATION, 11/13/2020). The computer can create a structured representation of each association that corresponds to a box.

The computer can continue the above procedure for smaller boxes in section 200 to generate other key-attribute pairs based on locations of textual elements. In some implementations, the computer can further use algorithms such as horizontal coalescence to identify "orphan" textual elements that are not associated with any boxes. Textual elements not associated with any boxes can be identified as located at the top of the hierarchy of boxes.

With the features for processing boxes described above, a computer no longer blindly processes the textual elements as isolated, meaningless characters located here and there. Rather, the computer can comprehend the logic relationships between multiple textual elements. This automated process helps to reduce human effort in processing large amount of documents and parsing meaningful information.

Figure 3A:
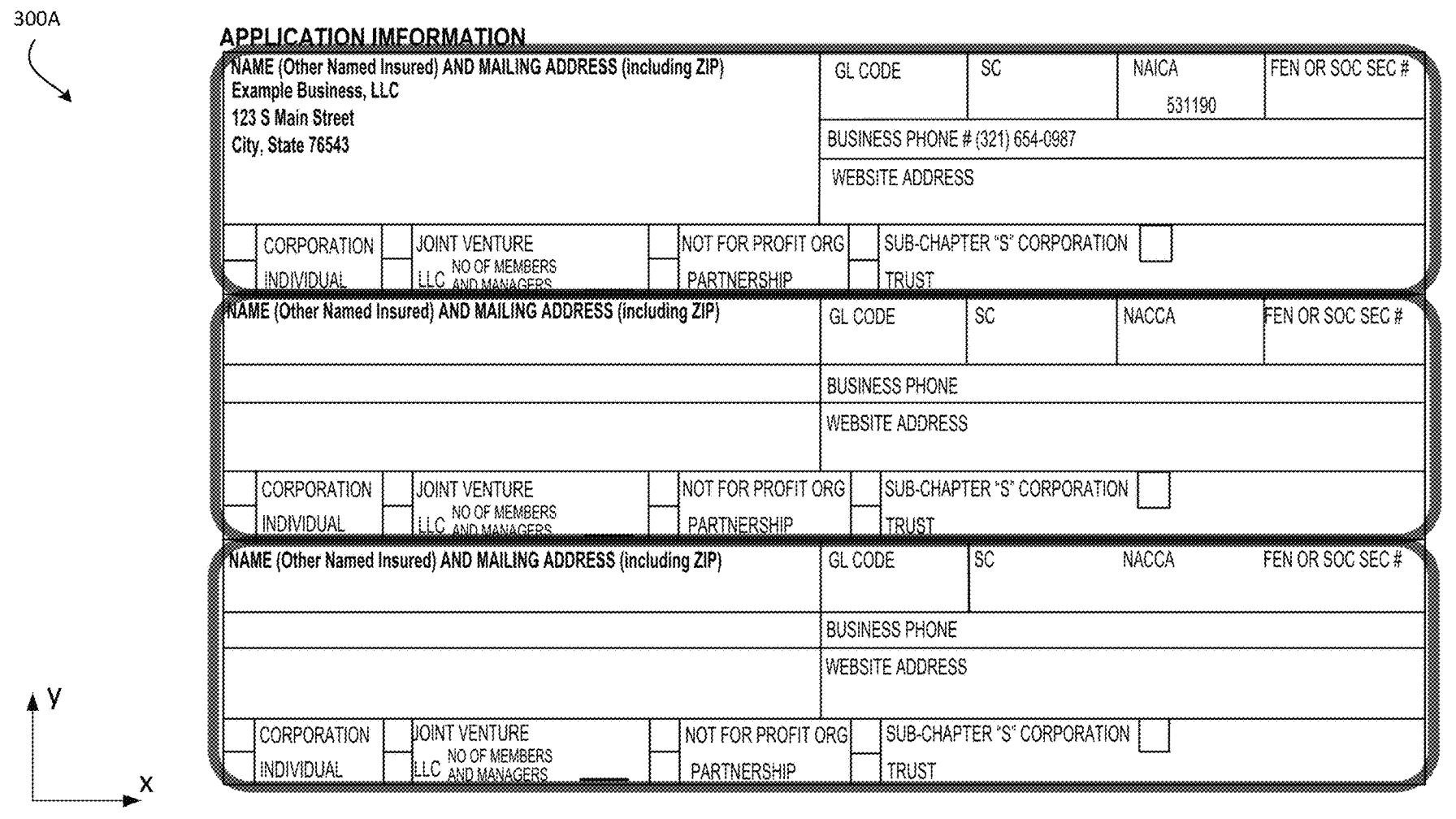

FIG. 3A illustrates a section 300A of an example document to be processed, according to some implementations. Section 300A is structured to have three boxes, vertically arranged, within a larger box (boundary not shown) under the same header "APPLICATION INFORMATION." The three boxes share the same structure and fields. Therefore, the three boxes are regarded as a group of sub-boxes.

Figure 3B:
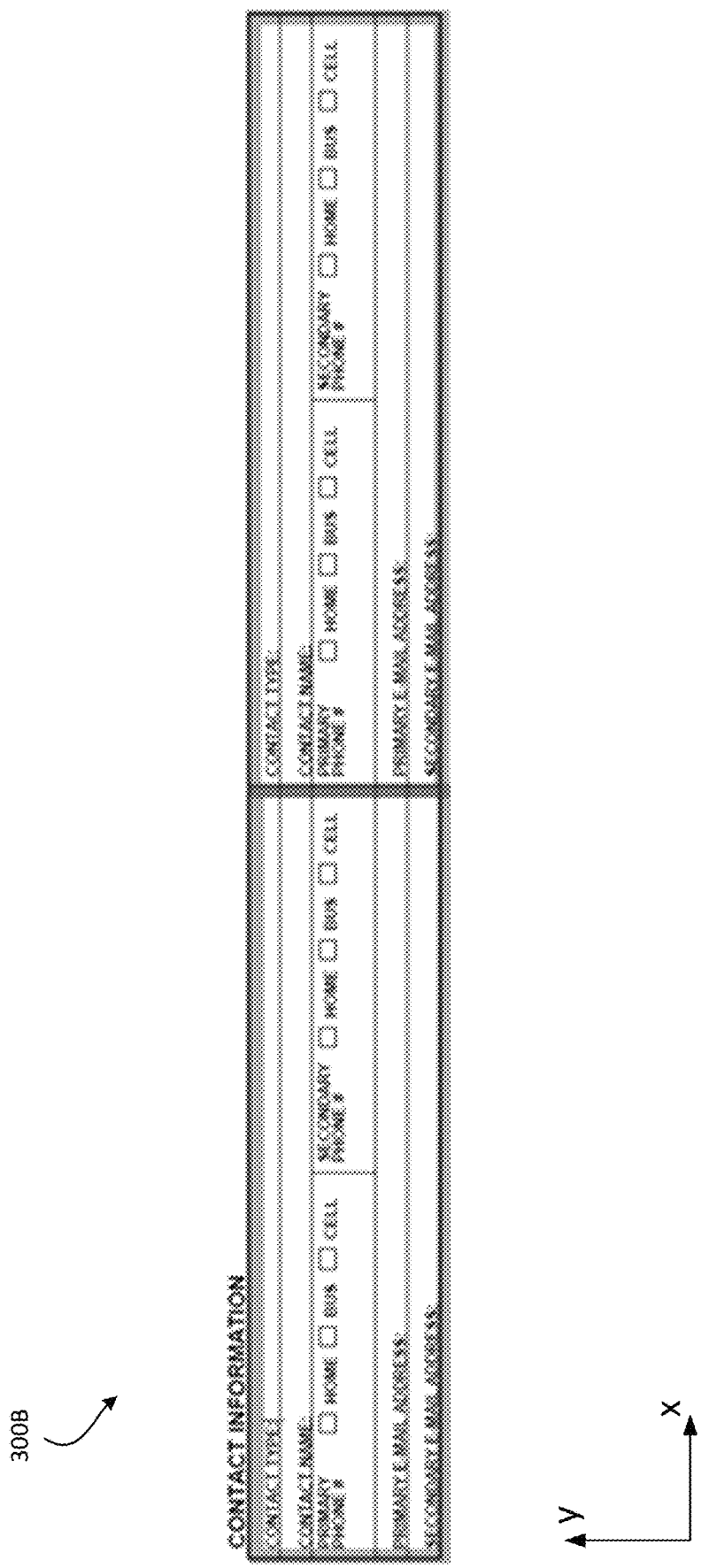
FIG. 3B illustrates a section of an example document to be processed, according to some implementations.

Similarly, FIG. 3B illustrates a section 300B of an example document to be processed, according to some implementations. Section 300B is structured to have two boxes, horizontally arranged, within a larger box (boundary not shown) under the same header "CONTACT INFORMATION." The two boxes share the same structure and fields. Therefore, the two boxes are regarded as a group of sub-boxes.

It is noted that the same document may contain multiple groups of sub-boxes that are distinct. For example, the computer may identify, within the same document, both the sub-boxes in section 300A and the sub-boxes in section 300B. In some implementations, the computer recognizes the structural similarities within each group as well as the structural distinction between the two groups. The details of identifying a group of sub-boxes are described below.

The groups of sub-boxes in sections 300A and 300B can be identified and processed by one or more implementations of this disclosure. According to some implementations, identifying sub-boxes within a larger box begins with determining the number of sub-boxes. The number of sub-boxes within a larger box can be determined as equal to the median number of repeated keys in the larger box. For example, in the larger box "APPLICATION INFORMATION" of section 300A, most keys, such as "NAME (Other Named Insured) AND MAILING ADDRESS (including ZIP)," "GL CODE," "SC," and "NAICA," repeat three times, and the median number of repetition is three. Therefore, the computer determines that the larger box in section 300A has three sub-boxes. Similarly, in the larger box "CONTACT INFORMATION" of section 300B, most keys, such as "CONTACT TYPE:," "CONTACT NAME," "PRIMARY PHONE #," and "PRIMARY EMAIL ADDRESS:," repeat twice, and the median number of repetition is two. Therefore, the computer determines that the larger box in section 300B has two sub-boxes.

According to some implementations, identifying sub-boxes further involves determining the vertical or horizontal orientation of the arrangement of sub-boxes. To determine the orientation of arrangement, the computer first identifies the most repeated key in the larger box. For example, in section 300A, because the highest number of key repetition is three, the computer can pick any key that repeats three times. Similarly, in section 300B, the computer can pick any key that repeats.

After picking the most common key, the computer calculates the standard deviations of the x-coordinate (corresponding the horizontal location) and the y-coordinate (corresponding the vertical location) of the key, represented as $\sigma_x$ and $\sigma_y$, respectively. The computer compares $\sigma_x$ and $\sigma_y$, and determines the orientation of arrangement based on the comparison result: If $\sigma_x > \sigma_y$, then the sub-boxes are arranged in a horizontal orientation; Otherwise, if the $\sigma_x < \sigma_y$, sub-boxes are arranged in a vertical orientation.

In the example of FIG. 3A, assuming the computer picks "GL CODE" as the most repeated key in section 300A, the computer first obtains the coordinates of the three repeated instances of "GL CODE," represented as $(x_1, y_1)$, $(x_2, y_2)$, and $(x_3, y_3)$. The computer then calculates the standard deviation $\sigma_x$ of $x_1$, $x_2$, and $x_3$, and the standard deviation $\sigma_y$ of $y_1$, $y_2$, and $y_3$. Because the three instances of "GL CODE" have substantially the same x coordinates, $\sigma_x$ is close to zero. Conversely, each instance of "GL CODE" has a different y coordinate, so $\sigma_y$ is significantly greater than zero. Because $\sigma_x < \sigma_y$, the computer determines that the three sub-boxes are arranged in a vertical orientation.

Likewise, in the example of FIG. 3B, assuming the computer picks "CONTACT TYPE" as the most repeated key in section 300A, the computer first obtains the coordinates of the two repeated instances of "CONTACT TYPE," represented as $(x_1, y_1)$ and $(x_2, y_2)$. The computer then calculates the standard deviation $\sigma_x$ of $x_1$ and $x_2$, and the standard deviation $\sigma_y$ of $y_1$ and $y_2$. Because the two instances of "CONTACT TYPE" have substantially the same y coordinates, $\sigma_y$ is close to zero. Conversely, each instance of "CONTACT TYPE" has a different x coordinate, so $\sigma_x$ is significantly greater than zero. Because $\sigma_x > \sigma_y$, the computer determines that the two sub-boxes are arranged in a horizontal orientation.

After determining the number of sub-boxes and the orientation of arrangement, the computer can further identify the scope of each sub-box, i.e., which key-attribute pairs belong to each sub-box and which do not belong. A number of algorithms are available for the determination, including strict filtering path, symmetry path, and benchmarking path. The basic principles of these algorithms are known by one of ordinary skill in the art. Therefore, the below description focuses on the application of these algorithms to implementations of this disclosure.

In some implementations, a computer applies the strict filtering path algorithm to determine the textual elements that belong to a sub-box. The algorithm can include identifying the maximum number of repetitions of any given key. It is possible that some keys do not have a value associated with them. For these "valueless keys," the computer can apply fuzzy matching to identify keys that repeat fewer times than the number of sub-box instances. These valueless keys can be filtered out, and the remaining repeated keys can be sorted (e.g., ranked in order) by their coordinates depending on the orientation of arrangement of sub-boxes. As such, the key-value pairs are associated with their corresponding sub-boxes, which are ranked in order.

In some implementations, a computer applies the symmetry path algorithm to determine the textual elements that belong to a sub-box. This algorithm assumes that sub-boxes are symmetrically arranged in the document and have the same collection of keys. In applying this algorithm to a number of sub-boxes enclosed by a larger box, the computer obtains the coordinates of the boundary of the larger box, divides the larger box according to the number of sub-boxes in the group, and thereby obtains the coordinates of the boundaries of the sub-boxes. The computer then go through the coordinates of the keys to determine whether a key-attribute pair is within each sub-box.

In some implementations, a computer applies the benchmarking path algorithm to determine the textual elements that belong to a sub-box. In applying this algorithm to a number of sub-boxes, the computer first determines keys that repeat the same number of times as the number of sub-box repetitions. The computer then sorts these keys to represent the sub-boxes according to the coordinates of the keys. After sorting, these representative keys, or benchmarks/anchor, are used for allocating the other keys into the sub-boxes. Specifically, to allocate a key using a benchmark/anchor, the computer calculates the distances between the key to all benchmarks/anchors and finds the closet benchmark/anchor to the key. The key and its corresponding attribute are then allocated to the sub-box represented by the closest benchmark/anchor.

The above algorithms can be applied alone or in combination, depending on the complexity of document and the available computing resources. After identifying and processing sub-boxes, the computer can create a structured representation of each group of sub-boxes.

With the features for processing sub-boxes described above, a computer can quickly identify multiple entries pertaining to the same subject in a document. Thus, the computer can save time processing the similar entries and present the results in an organized manner with reduced human involvement.

FIG. 4 illustrates a section 400 of an example document to be processed, according to some implementations. Section 400 is structured to have a number of selection prompts, each prompt having one or more checkboxes. Each check box has one or more leading graphical elements "☐" followed by corresponding textual elements.

The checkboxes in section 400 can be identified and processed by one or more implementations of this disclosure. In some implementations, a computer first searches the textual elements to look for selection prompts. The computer can use as guidance a library storing pre-defined keywords that indicate a selection. For example, the computer searches all textual elements appearing in section 400 and identifies "15. Unit Occupancy Type" as a selection prompt predefined in a database.

In some implementations, the computer then performs a boundary demarcation algorithm to determine the reach of the selection prompt on the document. The determination can be based on the coordinates of the prompt and the non-prompt textual elements. For example, in processing section 400, the computer can determine the upper boundary corresponding to prompt "15. Unit Occupancy Type" to be slightly above the y coordinate of prompt, and the left boundary corresponding to the prompt to be slightly to the left of the x coordinate of the prompt. The computer can determine the lower and right boundaries corresponding to the prompt to be either (i) the upper and left boundaries corresponding to other identified prompts, or (ii) shapes (e.g., lines) that graphically delineate a boundary of a box or sub-box. The boundary demarcation can further be assisted with tolerance values that the computer learns either from human input or from training samples to improve demarcation accuracy.

In some implementations, the computer then associates the selection prompt with all non-prompt textual elements within the determined boundaries and creates a key-attribute pair with the prompt and each associated textual element. In the example of section 400, the computer associates "15. Unit Occupancy Type" with "Single Family Home," "Apartment/Multi-Family Dwelling," . . . and "Warehouse." The computer also creates key-attribute pairs such as (15. Unit Occupancy Type, Single Family Home), (15. Unit Occupancy Type, Apartment/Multi-Family Dwelling), and (15. Unit Occupancy Type, Warehouse).

Some documents have "standalone" checkboxes that are usually self-explanatory and thus not prompted by any textual elements. The standalone checkboxes are, therefore, not enclosed by the boundaries corresponding to any prompts. Examples of standalone checkboxes include "☐ Rent ☐ Own" in a housing questionnaire or "☐ Smoker" in a health questionnaire.

A computer can process standalone checkboxes in various ways. In some implementations, the computer treats standalone checkboxes as having a missing key in a key-attribute pair, such as (<MISSING>, Rent). Alternatively, the computer treats standalone checkboxes as having identical key and attribute, such as (Rent, Rent). In some implementations, the computer assigns a key to a standalone checkbox based on the computer's own configuration, such as (STANDALONE, Rent).

With the features for processing checkboxes described above, the computer creates a meaningful link between a selection prompt (or a computer-assigned key) and the available choices. The computer can be further configured to interpret the choice(s) with little human intervention. This automated process can significantly improve the efficiency of processing electronic documents with checkboxes.

Figure 5:
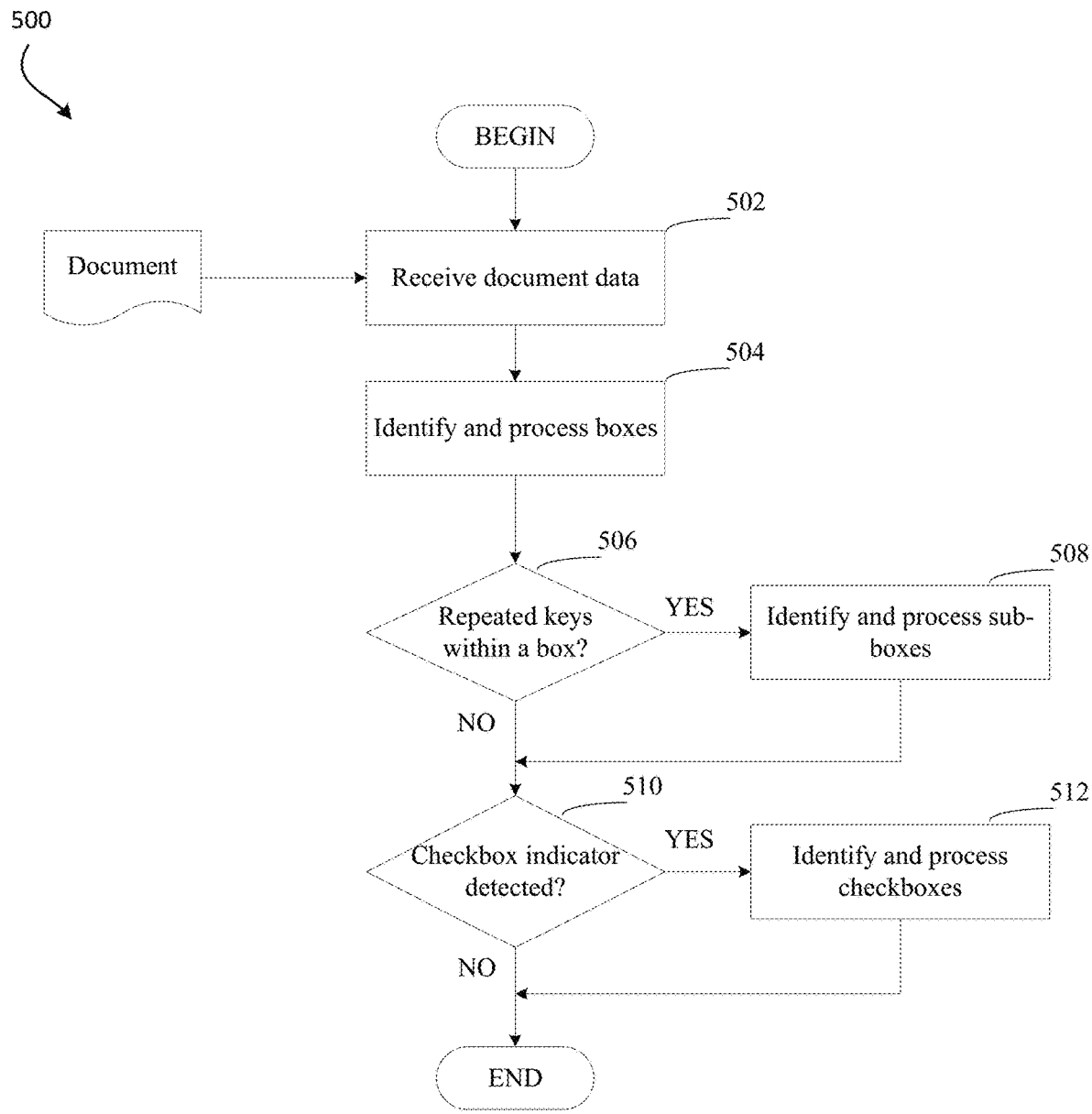
FIG. 5 illustrates a flowchart showing the triggering conditions of algorithms for boxes, sub-boxes, and checkboxes, according to some implementations.

FIG. 5 illustrates a flowchart showing conditions 500 for trigger the algorithms to process boxes, sub-boxes, and checkboxes, according to some implementations. Conditions 500 can be implemented on a computer. The algorithms triggered can be the same as those described with reference to FIGS. 1-4.

At 502, conditions 500 begin with the computer receiving document data. As described above, the data include textual elements and graphic elements.

At 504, the computer triggers the algorithm to identify and process boxes. That is, algorithms for identifying and processing boxes are triggered for each document.

At 506, the computer determines any key repetitions within each box. If the answer is Yes, the computer triggers the algorithm to identify and process sub-boxes at 508. That is, algorithms for identifying and processing sub-boxes are triggered upon detection of key repetitions within a box. Otherwise, the computer moves to 510.

At 510, the computer determines the existence of any checkbox indicators. These indicators can include symbols such as "☐" and keywords pre-defined in the computer's storage. If checkbox indicators are detected, the computer triggers the algorithm to identify and process checkboxes at 512. That is, algorithms for identifying and processing checkboxes are triggered upon detection of checkbox indicators. Otherwise, the flow ends.

Although sub-box detection (506 and 508) takes place before checkbox detection (510 and 512) in conditions 500, the detections of sub-box and checkbox can follow different timing. For example, sub-box detection can take place after checkbox detection in some implementations, or simultaneously with checkbox detection in some implementations.

The above procedures for identifying and processing boxes, sub-boxes, and checkboxes can be assisted with human supervision or artificial intelligence (AI) techniques such as machine learning to improve accuracy. For example, using a machine learning model, a computer can be trained to recognize graphical elements of different shapes and determine boundaries of the boxes. The computer can also be trained to identify textual elements as keywords that indicate boxes, sub-boxes, or checkboxes.

Outcomes of the above procedures can in return be used to train a machine learning model. For example, the machine learning model can use the obtained key-attribute association to build its knowledge base for predicting the logic relationships between textual elements, thereby improving accuracy in document processing.

Figure 6:
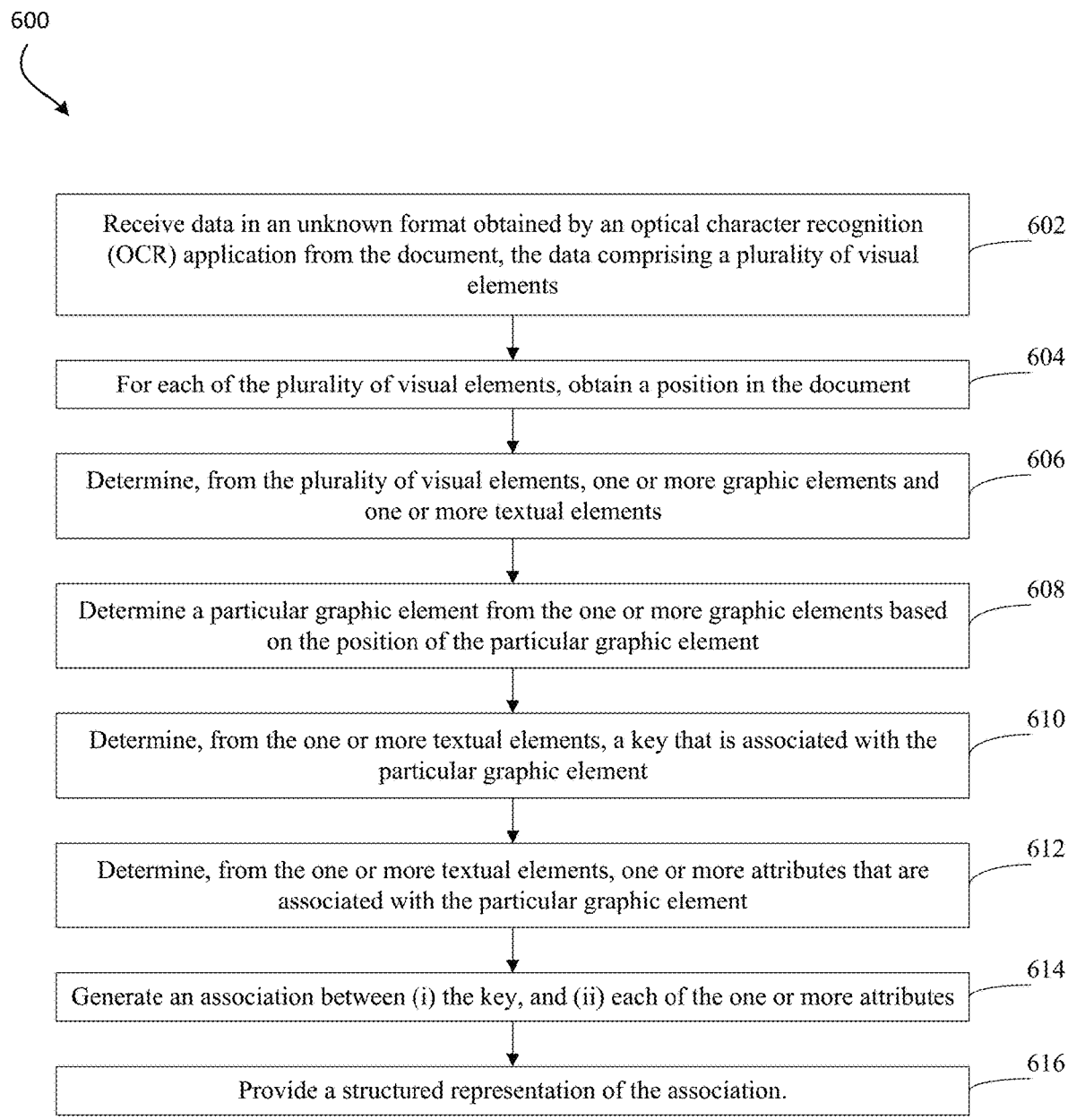
FIG. 6 illustrates a flowchart of an example method, according to some implementations.

FIG. 6 illustrates a flowchart of an example method 600, according to some implementations. Method 600 can be implemented on a computer. One or more steps of method 600 can correspond to the operations described with reference to FIGS. 1-5.

At 602, method 600 involves receiving data in an unknown format obtained by an OCR application from the document, the data comprising a plurality of visual elements.

At 604, method 600 involves obtaining a position in the document for each of the plurality of visual elements.

At 606, method 600 involves determining, from the plurality of visual elements, one or more graphic elements and one or more textual elements.

At 608, method 600 involves determining a particular graphic element from the one or more graphic elements based on the position of the particular graphic element.

At 610, method 600 involves determining, from the one or more textual elements, a key that is associated with the particular graphic element.

At 612, method 600 involves determining, from the one or more textual elements, one or more attributes that are associated with the particular graphic element.

At 614, method 600 involves generating an association between (i) the key, and (ii) each of the one or more attributes.

At 616, method 600 involves providing a structured representation of the association.

Figure 7:
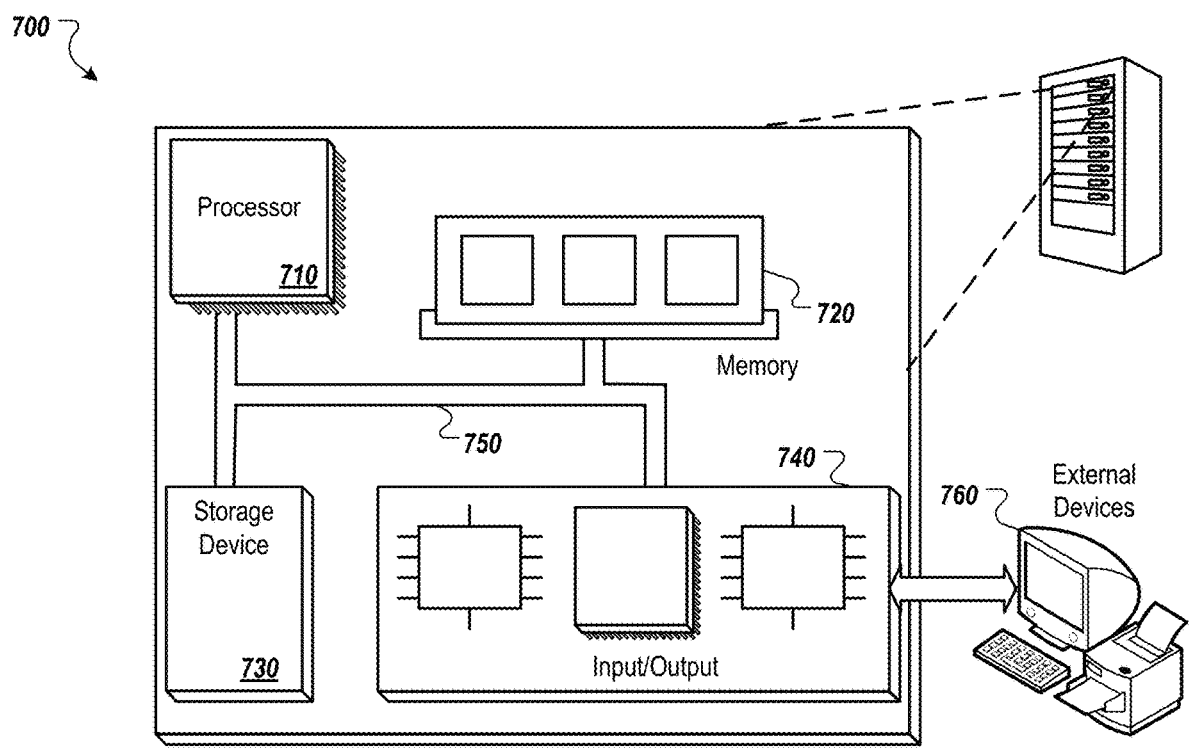
FIG. 7 illustrates a block diagram of an example computer system, according to some implementations.

FIG. 7 is a block diagram of an example computer system 700 in accordance with embodiments of the present disclosure. The system 700 includes a processor 710, a memory 720, a storage device 730, and one or more input/output interface devices 740. Each of the components 710, 720, 730, and 740 can be interconnected, for example, using a system bus 750.

The processor 710 is capable of processing instructions for execution within the system 700. The term "execution" as used here refers to a technique in which program code causes a processor to carry out one or more processor instructions. In some implementations, the processor 710 is a single-threaded processor. In some implementations, the processor 710 is a multi-threaded processor. The processor 710 is capable of processing instructions stored in the memory 720 or on the storage device 730. The processor 710 may execute operations such as those described with reference to other figures described herein. For example, the processor 710 may be configured to execute one or more steps of method 600 illustrated in FIG. 6.

The memory 720 stores information within the system 700. In some implementations, the memory 720 is a computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 can include, for example, a hard disk device, an optical disk device, a solid-state drive, a flash drive, magnetic tape, or some other large capacity storage device. In some implementations, the storage device 730 may be a cloud storage device, e.g., a logical storage device including one or more physical storage devices distributed on a network and accessed using a network. In some examples, the storage device may store long-term data. The input/output interface devices 740 provide input/output operations for the system 700. In some implementations, the input/output interface devices 740 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 700 to communicate, for example, transmit and receive data. In some implementations, the input/output device can include driver devices configured to receive input data and send output data to other input/output devices, e.g., keyboard, printer and display devices 760. In some implementations, mobile computing devices, mobile communication devices, and other devices can be used.

A server can be distributed across a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 700 is contained within a single integrated circuit package. A system 700 of this kind, in which both a processor 710 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 740.

Although an example processing system has been described in FIG. 7, implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware-or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a GNSS sensor or receiver, or a portable storage device such as a universal serial bus (USB) flash drive.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A computer-implemented method for obtaining content of a document, the method comprising:
  receiving data obtained by an optical character recognition (OCR) application from the document that has an unknown form structure, the data comprising a plurality of visual elements;
  for each of the plurality of visual elements, obtaining a position in the document;
  selecting, from among the plurality of visual elements, one or more graphic elements and one or more textual elements;
  selecting a particular graphic element from among the one or more graphic elements based on the position of the particular graphic element;
  selecting, from among the one or more textual elements, a key that is associated with the particular graphic element;
  selecting, from among the one or more textual elements, one or more attributes that are associated with the particular graphic element;
  generating a respective association between (i) the key that has been selected from among the one or more textual elements, and (ii) each of the one or more attributes that were selected from among the one or more textual elements; and
  providing a structured representation of the associations.

2. The method of claim 1, wherein each position is represented by one or more horizontal coordinates and one or more vertical coordinates.

3. The method of claim 1, wherein determining the particular graphic element comprises:
  determining contours of the one or more graphic elements based on the positions thereof;
  identifying a box among the one or more graphic elements based on the contours thereof; and
  determining the box as the particular graphic element.

4. The method of claim 1, further comprising:
  determining a positional relationship between the particular graphic element and each of the one or more textual elements.

5. The method of claim 3, further comprising:
  identifying a plurality of enclosed boxes within the identified box;
  determining that the keys associated with plurality of enclosed boxes are the same;
  grouping the plurality of enclosed boxes as sub-boxes;
  associating the grouping with the same keys of the sub-boxes; and
  providing a structured representation of the grouping.

6. The method of claim 5, further comprising:
  determining a total number of the sub-boxes; and
  indicating the total number of the sub-boxes in the structured representation.

7. The method of claim 5, further comprising:
  determining an orientation of arrangement of the sub-boxes; and
  indicating the orientation in the structured representation.

8. The method of claim 6, wherein determining the total number of the sub-boxes comprises:
  calculating a median number of repetitions of keys within the identified box.

9. The method of claim 7, wherein determining the orientation of arrangement of the sub-boxes comprises:
  determining horizontal coordinates of the same keys of the sub-boxes;

determining vertical coordinates of the same keys of the sub-boxes;

calculating a standard deviation of the horizontal coordinates;

calculating a standard deviation of the vertical coordinates; and comparing the standard deviation of the horizontal coordinates and standard deviation of the vertical coordinates.

10. The method of claim 1, further comprising:

identifying a checkbox indicator;

determining one or more textual elements as one or more choices corresponding to the checkbox indicator;

associating the one or more choices and the checkbox indicator; and providing a structured representation of the association between the one or more choices and the checkbox indicator.

11. The method of claim 10, wherein the checkbox indicator comprises at least one of:

a graphic symbol, or a textual prompt.

12. The method of claim 1, further comprising:

training a machine learning model using the structured representation.

13. A non-transitory computer-readable medium containing program instructions that, when executed, cause a computer to perform operations to obtain content of a document, the operations comprising:

receiving data obtained by an optical character recognition (OCR) application from the document that has an unknown form structure, the data comprising a plurality of visual elements;

for each of the plurality of visual elements, obtaining a position in the document;

selecting, from among the plurality of visual elements, one or more graphic elements and one or more textual elements;

selecting a particular graphic element from among the one or more graphic elements based on the position of the particular graphic element;

selecting, from among the one or more textual elements, a key that is associated with the particular graphic element;

selecting, from among the one or more textual elements, one or more attributes that are associated with the particular graphic element;

generating a respective association between (i) the key that has been selected from among the one or more textual elements, and (ii) each of the one or more attributes that were selected from among the one or more textual elements; and providing a structured representation of the associations.

14. The non-transitory computer-readable medium of claim 13, wherein determining the particular graphic element comprises:

determining contours of the one or more graphic elements based on the positions thereof;

identifying a box among the one or more graphic elements based on the contours thereof; and determining the box as the particular graphic element.

15. The non-transitory computer-readable medium of claim 13, the operations further comprising:

determining a positional relationship between the particular graphic element and each of the one or more textual elements.

16. The non-transitory computer-readable medium of claim 14, the operations further comprising:

identifying a plurality of enclosed boxes within the identified box;

determining that the keys associated with plurality of enclosed boxes are the same;

grouping the plurality of enclosed boxes as sub-boxes;

associating the grouping with the same keys of the sub-boxes; and providing a structured representation of the grouping.

17. The non-transitory computer-readable medium of claim 16, the operations further comprising:

determining a total number of the sub-boxes; and indicating the total number of the sub-boxes in the structured representation.

18. The non-transitory computer-readable medium of claim 17, the operations further comprising:

determining an orientation of arrangement of the sub-boxes; and indicating the orientation in the structured representation.

19. The non-transitory computer-readable medium of claim 18, wherein determining the orientation of arrangement of the sub-boxes comprises:

determining horizontal coordinates of the same keys of the sub-boxes;

determining vertical coordinates of the same keys of the sub-boxes;

calculating a standard deviation of the horizontal coordinates;

calculating a standard deviation of the vertical coordinates; and comparing the standard deviation of the horizontal coordinates and standard deviation of the vertical coordinates.

20. The method of claim 1, wherein, when the data was received, the form structure was unknown and the document was already filled in with content by a human.

* * * * *